United States Patent
Blanchard et al.

(10) Patent No.: US 8,197,785 B2
(45) Date of Patent: Jun. 12, 2012

(54) SPLIT FLOW CONTACTOR

(75) Inventors: Kenneth L. Blanchard, Houston, TX (US); David P. Mann, Katy, TX (US)

(73) Assignee: Kellogg Brown & Root LLC, Houston, TX (US)

(*) Notice: Subject to any disclaimer, the term of this patent is extended or adjusted under 35 U.S.C. 154(b) by 508 days.

(21) Appl. No.: 12/038,235

(22) Filed: Feb. 27, 2008

(65) Prior Publication Data
US 2009/0214410 A1 Aug. 27, 2009

(51) Int. Cl.
*C01B 31/20* (2006.01)
*B01J 10/00* (2006.01)
*B01J 8/04* (2006.01)

(52) U.S. Cl. ........... 423/437.2; 422/607; 422/636; 422/638; 422/644; 422/645; 422/220

(58) Field of Classification Search ............ 422/191, 422/192, 193, 195, 220, 261, 255; 423/437.2, 423/659; 29/890, 890.031
See application file for complete search history.

(56) References Cited

U.S. PATENT DOCUMENTS

| | | | |
|---|---|---|---|
| 3,509,043 A | 4/1970 | McMaster et al. | |
| 4,298,589 A * | 11/1981 | LeBlanc et al. | 423/359 |
| 4,311,671 A * | 1/1982 | Notman | 422/148 |
| 4,313,908 A | 2/1982 | Gupta | |
| 4,380,529 A | 4/1983 | Gupta | |
| 4,482,523 A * | 11/1984 | Peterson | 422/148 |
| 5,413,699 A * | 5/1995 | Chou | 208/113 |
| 5,466,419 A | 11/1995 | Yount et al. | |
| 5,670,116 A * | 9/1997 | Gupta et al. | 422/191 |
| 5,942,197 A | 8/1999 | Gupta et al. | |
| 5,948,239 A | 9/1999 | Virdi et al. | |
| 5,985,231 A | 11/1999 | Filippi et al. | |
| 6,692,705 B2 | 2/2004 | Gupta et al. | |
| 7,081,230 B2 | 7/2006 | Blanchard | |
| 7,138,001 B2 | 11/2006 | Knez et al. | |

FOREIGN PATENT DOCUMENTS
WO WO2006/032839 * 3/2006

OTHER PUBLICATIONS

Ladebeck, J.R. and et al., Catalyst development for water-gas shift, Handbook of Fuel Cells—Fundamentals, Technology and Applications, 2003, pp. 190-201, vol. 3, part 2, John Wiley & Sons, Ltd, Chichester.

* cited by examiner

*Primary Examiner* — Walter D Griffin
*Assistant Examiner* — Lessanework Seifu
(74) *Attorney, Agent, or Firm* — KBR IP Legal Dept.

(57) ABSTRACT

Systems and methods for contacting a liquid, gas, and/or a multi-phase mixture with particulate solids. The system can include a body having a first head and a second head disposed thereon. Two or more discrete fixed beds can be disposed across a cross-section of the body. One or more unobstructed fluid flow paths can bypass each fixed bed, and one or more baffles can be disposed between the fixed beds.

20 Claims, 6 Drawing Sheets

SPLIT FLOW CONTACTOR

BACKGROUND

1. Field

The present embodiments generally relate to a split-flow contactor for fixed bed catalysis and methods for using same.

2. Description of the Related Art

Carbon monoxide is a by-product of syngas production and other chemical processes. Carbon monoxide can be a catalyst poison or contaminant and thus, problematic for downstream processing. However, carbon monoxide is combustible, highly reactive, and potentially poisonous at certain concentrations and cannot be released to atmosphere in any significant quantities.

Processes for oxidizing carbon monoxide to carbon dioxide have been used. Such techniques are typically known as carbon monoxide shifting, and are catalytically driven (See e.g. U.S. Pat. No. 3,509,043; U.S. Pat. No. 4,313,908; U.S. Pat. No. 4,380,529; U.S. Pat. No. 5,985,231; and U.S. Pat. No. 6,692,705). As with any catalytic process, bed geometry is one critical factor in the operation and optimization of the reaction. Often, maximizing production of desired products, or conversely, minimizing the production of undesired by-products, is largely dependent upon fluid residence time.

Fluid residence time is typically based on bed volume and volumetric flowrate to the bed. Thus, maintaining a pre-determined residence time while increasing flowrates or increasing residence time at a constant flowrate usually requires a proportionate increase in bed volume. Since pressure drop through the bed is typically proportional to the bed depth, bed volume is typically increased by maintaining a constant bed depth and increasing the bed surface area for applications which are limited in pressure drop.

However, economics and space limitations often preclude increasing cross sectional area within existing vessels or within processing facilities. In such instances, bed volume is typically increased by adding depth to an existing bed or by adding additional vessels in parallel or series. Increased bed depth results in increased pressure drop through the bed which is not always desirable and in some cases, is not an option.

There is a need, therefore, for systems and methods that provide suitable residence time, minimize pressure drop, and minimize space requirements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for contacting a liquid, gas, and/or a multi-phase mixture with particulate solids are provided. The system or contactor can include a body having a first head and a second head disposed thereon. Two or more discrete fixed beds can be disposed within and across a cross-section of the body. One or more unobstructed fluid flow paths can be used to bypass one or both fixed beds, and one or more baffles can be disposed between the fixed beds to regulate flow within the body. Each fixed bed can include one or more activated ("non-inert") solids, such as one or more catalysts, one or more ion exchange resins, one or more absorbents, one or more adsorbents, or any combination thereof.

Figure 1:
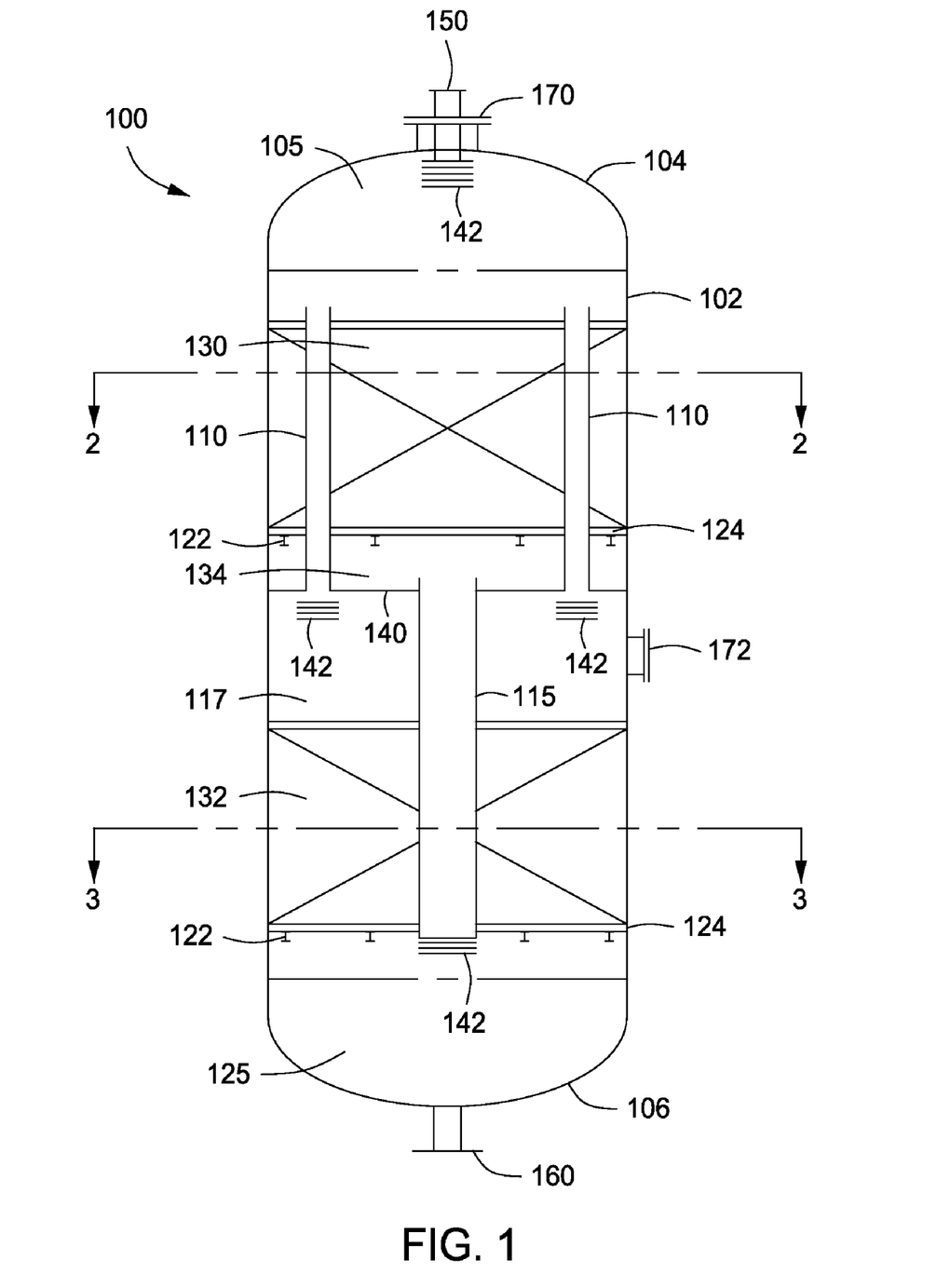
FIG. 1 depicts a partial cross-sectional view of an illustrative contactor according to one or more embodiments described.

With reference to the figures, FIG. 1 depicts a partial cross-sectional view of an illustrative contactor 100 according to one or more embodiments. The contactor 100 can include a body 102, a first end or head 104, a second end or head 106, a baffle 140, and one or more connections (four are shown 150, 160, 170, and 172). Two or more fixed beds (two are shown 130, 132) can be disposed within and across the inner diameter (i.e. cross-section) of the body 102. In one or more embodiments, each bed 130, 132 can be in contact with the entire inner diameter of the body 102, except for one or more unobstructed flow paths or conduits 110, 115 disposed therethrough.

In one or more embodiments, the one or more flow path(s) 110 can be at least partially disposed or formed through the first bed 130. The one or more flow path(s) 110 can be in fluid communication at a first end thereof with a volume or plenum 105 defined within the first head 104, and in fluid communication at a second end thereof with a volume or plenum 117 located between the beds 130, 132.

In one or more embodiments, the one or more flow path(s) 115 can be at least partially disposed or formed through the second bed 132. The flow path 115 can be in fluid communication at a first end thereof with a volume 134, and in fluid communication at a second end thereof with a volume 125. The volume 134 can be an empty space or plenum defined between the first bed 130 and the baffle 140. The volume 125 is contained or defined within the head 106.

Figure 2:
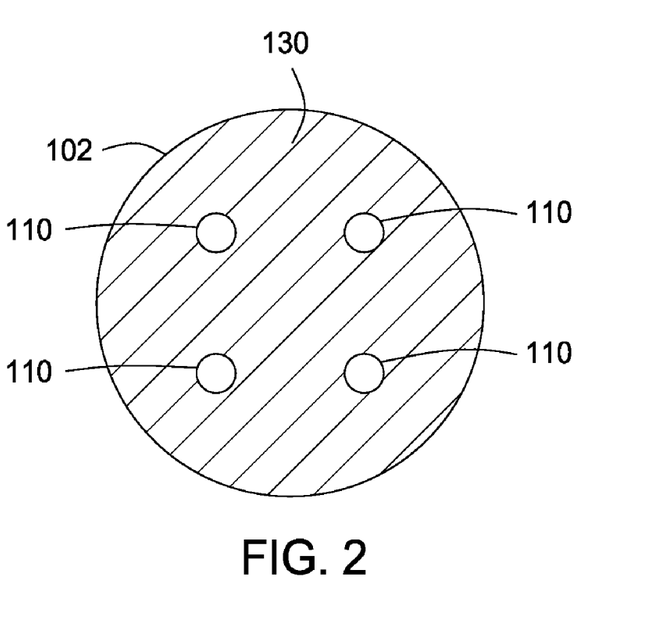
FIG. 2 depicts a cross-sectional view of the first fixed bed and flow paths disposed within the contactor depicted in FIG. 1 along line 2-2.

The flow path 110 ("first flow path" or "first bed bypass") can provide a bypass around or through the first bed 130 so that the fluid contained therein does not contact the first bed 130. The flow path(s) 115 ("second flow path" or "second bed bypass") can provide a bypass around or through the second bed 132 so that the fluid contained therein does not contact the second bed 132. The flow paths 110, 115 can be further described below with reference to FIGS. 2 and 3. FIG. 2 depicts a cross-sectional view of the first bed 130 along line 2-2 of the contactor 100. Two, three, four, or five or more flow paths 110 can be used to bypass or direct fluid flow around the bed 130. Four flow paths 110 are shown in FIG. 2. The flow paths 110 can be arranged in any pattern and/or in any frequency throughout the bed 130. As depicted in FIG. 2, the flow paths 110 can be uniformly disposed through the bed 130, and completely surrounded by the fixed bed. Accordingly, the solids within the bed 130 can cover or extend the entire inside diameter or cross-section of the body 102.

Figure 3:
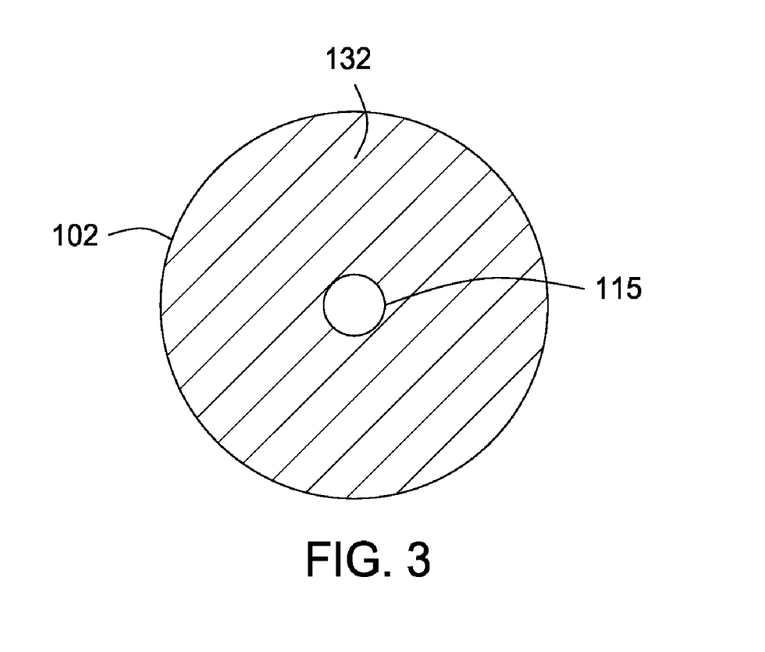
FIG. 3 depicts a cross-sectional view of the second fixed bed and flow paths disposed within the contactor depicted in FIG. 1 along line 3-3.

FIG. 3 depicts a cross-sectional view of the second bed 132 along line 3-3 of the contactor 100. One, two, three, four, or five or more flow paths 115 can be used to bypass or direct fluid flow around the bed 132. The flow path(s) 115 can be arranged randomly or can be evenly distributed throughout the cross section of the bed 132. As depicted in FIG. 3, a single flow path 115 can be disposed through the bed 132. The single flow path 115 can be disposed through the center of the bed 132 as depicted, or the flow path 115 can be disposed or arranged off-center such as near the outer perimeter or circumference of the bed 132. Like the solids of the first bed 130, the solids of the second bed 132 can cover or extend across the entire inner diameter or cross-section of the body 102.

Referring again to FIG. 1, one or more diffusers 142 can be disposed or located adjacent the flow paths 110, 115. Each diffuser 142 can be the same or different. The diffusers 142 can include a plurality of apertures, such as a "showerhead" configuration, or any other configuration suitable for distributing a fluid within the contactor 100. Each diffuser 142 can include any number of apertures and any size of apertures to distribute the fluids evenly. In one or more embodiments, one or more spray nozzles (not shown) can be disposed within some or all of the apertures of the one or more diffusers 142.

In one or more embodiments, the size (i.e. diameter) of the apertures and pattern of the apertures arranged about the diffuser 142 can be used to modify, adjust or manipulate the flow of fluid therethrough. For example, a random or uniform pattern of smaller or varying sized apertures can be disposed on one side or half of the diffuser 142 while a random or uniform pattern of larger diameter or varying sized apertures can be disposed on a second side or half of the same diffuser 142. Similarly, different diffusers 142 can be used, each having varying sizes and patterns of apertures to modify, adjust or manipulate the flow of fluid therethrough.

The contactor 100 can also include a support assembly for supporting the beds 130, 132 therein. Each support assembly can be adapted to support and hold the weight of the bed 130, 132. Each support assembly can include one or more fasteners 122 and one or more screens 124. The screen 124 can rest or otherwise be disposed on the fasteners 122. The fasteners 122 can be disposed, such as welded or bolted, on an inner surface of the contactor 100, and can be any one or more clips, bolts, hooks, I-beams, channels, etc. The structural supports 122 and screen 124 can be fabricated from any process compatible material such as aluminum, steel, steel alloys, stainless steel, stainless steel alloys, non-ferrous metals, non-ferrous metal alloys, or combinations thereof, for example.

Figure 4:
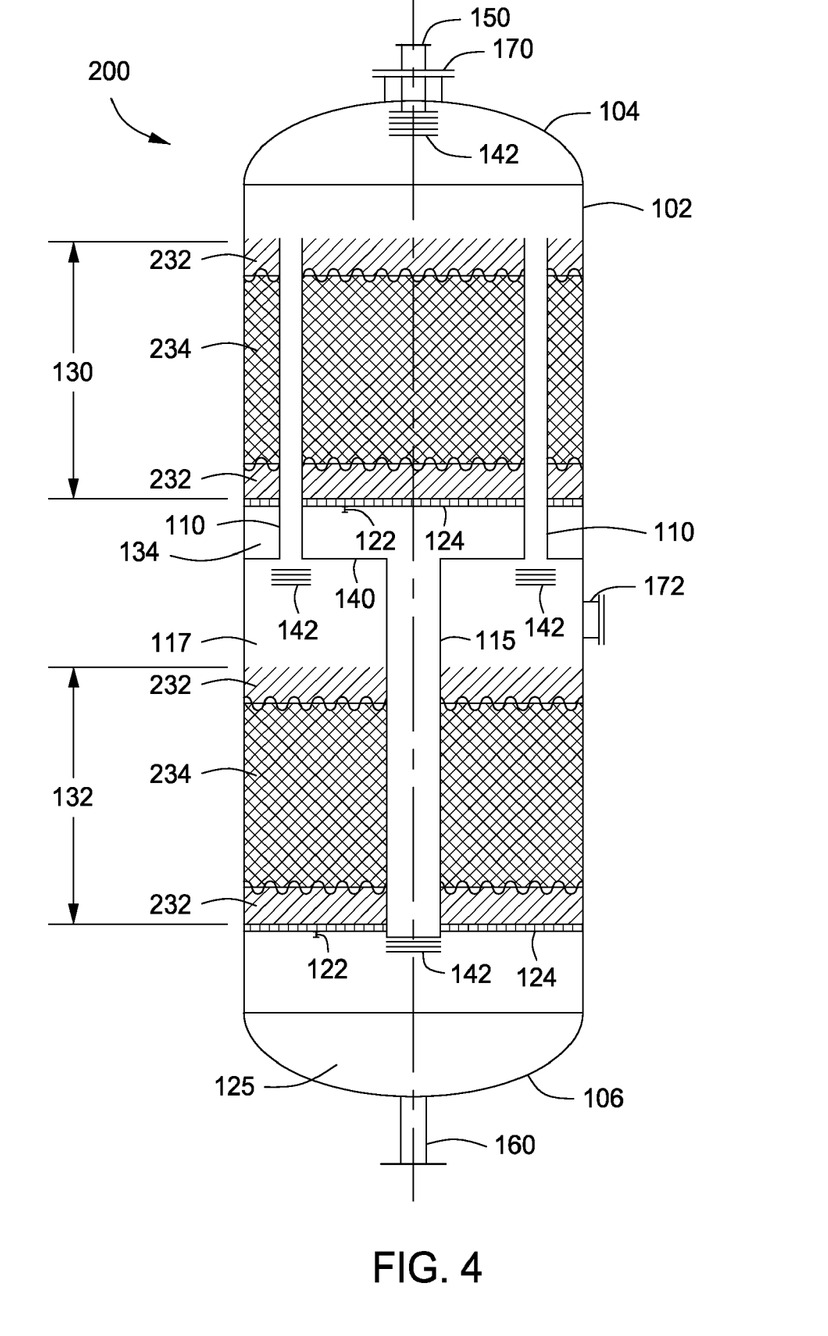
FIG. 4 depicts a partial cross-sectional view of another illustrative contactor according to one or more embodiments described.

Considering the fixed beds 130, 132 in more detail, the solids or particulates within the beds 130, 132 can be the same or different. In one or more embodiments, the beds 130, 132 can contain a single layer of one or more catalysts, one or more adsorbents, one or more absorbents, one or more ion exchange resins and/or one or more molecular sieves. In one or more embodiments, the beds 130, 132 can contain two or more layers, each layer containing one or more inert materials, one or more catalysts, one or more ion exchange resins, one or more adsorbents, one or more absorbents, one or more ion exchange resins, one or more molecular sieves, mixtures thereof, or any combination thereof. The one or more catalysts can be or include iron, chromium, copper, zinc, aluminum, oxides thereof, alloys thereof, or mixtures thereof. In at least one specific embodiment, a catalyst layer can include a Süd Chemie Type C12-4-02 catalyst having a tablet size of 6 mm×6 mm and a bulk density of 1120 kg/m$^3$ (70 lbs/ft$^3$) for converting carbon monoxide to carbon dioxide. In at least one specific embodiment, each bed 130, 132 can contain a first layer of one or more inert materials, a second layer of one or more inert materials, and a third layer containing one or more activated solids including one or more catalysts, adsorbents, absorbents, ion exchange resins, and/or molecular sieves, as depicted in FIG. 4.

The body 102, first head 104 and second head 106 can be detachably connected using removable fasteners including, but not limited to, bolts and other similar fasteners. In one or more embodiments, the body 102, first head 104 and second head 106 can be welded and/or riveted to one another. The heads 104, 106 can have any shape or profile. For example, the heads 104, 106 can be flat, ASME dished, parabolic, conical, or any other type of shape known in the industry and used to meet process design pressure and temperature requirements. While an illustrative cylindrical body 102 is depicted in FIG. 1, other geometries can be used. For example, the body 102 can be a cylindrical shell having a diameter ranging from about 0.2 m (0.6 ft) to about 20 m (66 ft); about 0.5 m (1.6 ft) to about 10 m 32.8 ft); or about 1 m (3 ft) to about 7 m (23 ft).

The connections 150, 160, 170, 172 can be disposed anywhere about the contactor 100, including the body 102 and heads 104, 106 to facilitate the installation and/or removal of solids and fluids, and for convenience in maintaining the internals of the contactor 100. In one or more embodiments, the connections 150, 160, 170, and 172 can be threaded, flanged, weld neck, or any other form of connection method used to attach fluid piping or tubing. In one or more embodiments, the connections 150, 160, 170, and 172 can be welded. In one or more embodiments, the connections 150, 160, 170, and 172 can be detachably connected using removable fasteners such as threaded connections. The one or more connections 150, 160, 170, and 172 can be fabricated from an appropriate material including, but not limited to aluminum, steel, steel alloys, stainless steel, stainless steel alloys, non-ferrous metals, non-ferrous metal alloys, or combinations thereof, based upon the process composition, process conditions, and desired corrosion resistance.

In one or more embodiments, the baffle 140 can be disposed between the beds 130, 132. When more than two beds 130, 132 are used, two baffles 140 can be used, one baffle 140 between adjoining beds. As shown in FIG. 1, the baffle 140 can be disposed between the two beds 130, 132 to isolate and/or divert fluid flow therebetween or therearound. The baffle 140 can be disposed any distance from the bottom or second end of the bed 130. The distance between the bed 130 and the baffle 140 determines the size of the volume 134, which can be dependent on the desired pressure drop and/or residence time through the contactor 100.

The baffle 140 can be a tray or other collection member. The baffle 140 can be disposed transverse to the centerline of the contactor 100, and proximate to the inner diameter of the body 102. The baffle 140 can be horizontal or angled relative to the vertical axis of the contactor 100. The baffle 140 can be adapted to isolate each bed 130, 132 from one another, blocking fluid that has passed through the first bed 130 (i.e. exiting the first bed 130) from the second bed 132, thereby bypassing the second bed 132 via the second flow path 115. As such, the second flow path 115 is in fluid communication with the upper surface of the baffle 140 and the first flow path(s) 110 are not in fluid communication with the upper surface of the baffle 140. In one or more embodiments, the baffle 140 can be fabricated from aluminum, steel, steel alloys, stainless steel, stainless steel alloys, non-ferrous metals, non-ferrous metal alloys, or combinations thereof.

In one or more embodiments, a first end of the flow path(s) 115 can be elevated or otherwise extend beyond the upper surface of the baffle 140 creating a weir. The weir can create a volume or head of fluid on the baffle 140 prior to overflowing into the flow path 115. Such embodiments can be useful for liquid service contactors such as a liquid contactor containing an ion-exchange resin for water treatment.

FIG. 4 depicts a partial cross-sectional view of an illustrative contactor 200 according to one or more embodiments. The fixed beds 130, 132 of the contactor 200 can include at least one activated solids layer 234 disposed between at least two inert layers 232. Each inert layer 232 can include one or more individual layers of inert materials such as tabular alumina, mullite, ceramic, mixtures thereof, or combinations thereof, for example. Each individual layer of each inert layer 232 can be the same (i.e. a single layer) or different. For example, each inert layer 232 can contain a uniform layer of an aggregate $Al_2O_3$ and $SiO_2$ assay of from about 92% wt to about 100% wt; from about 92% wt to about 97% wt; or from about 92% wt to about 95% wt. In one or more embodiments, the inert layers 232 can contain a uniform layer of an aggregate assay of $Fe_2O_3$ of from about 1% wt, from about 0.75% wt, from about 0.5% wt or from about 0.25% wt or less. In one or more embodiments, the depth each layer 232 can range in depth (i.e. height) from about 10 cm (4 inches) to about 51 cm (20 inches); from about 10 cm (4 inches) to about 30 cm (12 inches); or from about 10 cm (4 inches) to 20 cm (8 inches). The depth of the inert layers 232 can be dependent on the desired pressure drop and residence time through the bed 130, 132.

In one or more embodiments, the activated solids layer 234 can include, but is not limited to, one or more catalysts or catalyst types, one or more ion exchange resins, one or more adsorbents, one or more absorbents, and one or more molecular sieves. The depth of the solids layer 234 can vary. For example, the depth of the layer 234 can range from about 1.8 m (72 inches) to about 3.6 m (144 inches); from about 2.1 m (84 inches) to about 3.4 m (132 inches); or from about 2.4 m (96 inches) to about 3.0 m (120 inches). The depth of the layer 234 can be dependent on the desired pressure drop and residence time through the bed 130, 132.

Referring to FIGS. 1-4, a fluid, i.e. liquid or gas, can be introduced to the body 102 via the first connection ("inlet") 150, and distributed within the first volume 105 using the first diffuser 142. A first portion of the distributed fluid can flow through the first bed ("upper bed") 130 to provide a treated fluid ("first effluent") and a second portion of the distributed fluid can bypass the first bed 130 via the one or more flow paths 110 to the second bed ("lower bed") 132. The treated fluid from the first bed 130 can be isolated or collected on the baffle 140 and then bypassed around the second bed 132 via the flow path(s) 115. The second portion of the fluid that bypassed the first bed 130 via the flow paths 110 can be distributed across the second bed 132 to provide a treated fluid ("second effluent") exiting the second bed 132 within the volume 125. The one or more diffusers 142 adjacent the outlet of the flow paths 110 can be used to better distribute the fluid flow across the bed 132. The first effluent, from the first bed 130, can exit the flow path 115 and can be combined or otherwise mixed with the second effluent from the second bed 132. The mixed effluents can exit the contactor 100, 200 via the second connection ("outlet") 160. In one or more embodiments, the fluid flow through any of the contactors 100 or 200 can be reversed, i.e. fluid can be introduced to the contactor via connection 160 and exit via connection 150.

The first portion of the distributed fluid can be at least 10 vol %, 20 vol %, 50 vol %, 60 vol %, 70 vol %, 80 vol %, 90 vol %, 95 vol %, or 99 vol % of the incoming feed to the contactor 100, 200. The balance can be the second portion of the distributed fluid that is treated in the second bed 132. By splitting the fluid to be treated into separate portions, the pressure drop through the contactor 100, 200 and the cross sectional area of the contactor 100, 200 can be minimized or at least reduced. By reducing the flowrate through the individual beds 130, 132, the residence time in each bed 130, 132 can be increased. Alternatively, a constant residence time within each bed 130, 132 can be maintained by proportionately reducing both the flowrate through the individual beds 130, 132 and the solids volume in each bed 130, 132. As such, the desired residence time, minimum pressure drop, and minimum space requirements can all be obtained within a single vessel (i.e. contactor).

In one or more embodiments, the pressure drop of the first portion of the fluid flowing through the first bed 130 and the one or more flow paths 115 can be balanced or equalized with the pressure drop of the second portion of the fluid flowing through the one or more flow paths 110 and second bed 132. Balancing or equalizing the differential pressure through the independent flow paths within the contactor 100, 200 can provide consistent bed performance and depletion, thereby optimizing both the efficiency and life of the activated solids. e.g. catalysts therein. Various devices or techniques for increasing or reducing pressure drop through the one or more fluid conduits 110, such as dampers (not shown), valves (not shown), variable orifice diffusers (not shown) or the functional equivalent thereof can be used to adjust and/or balance the pressure drop for each independent fluid flow path through the contactor.

Figure 5:
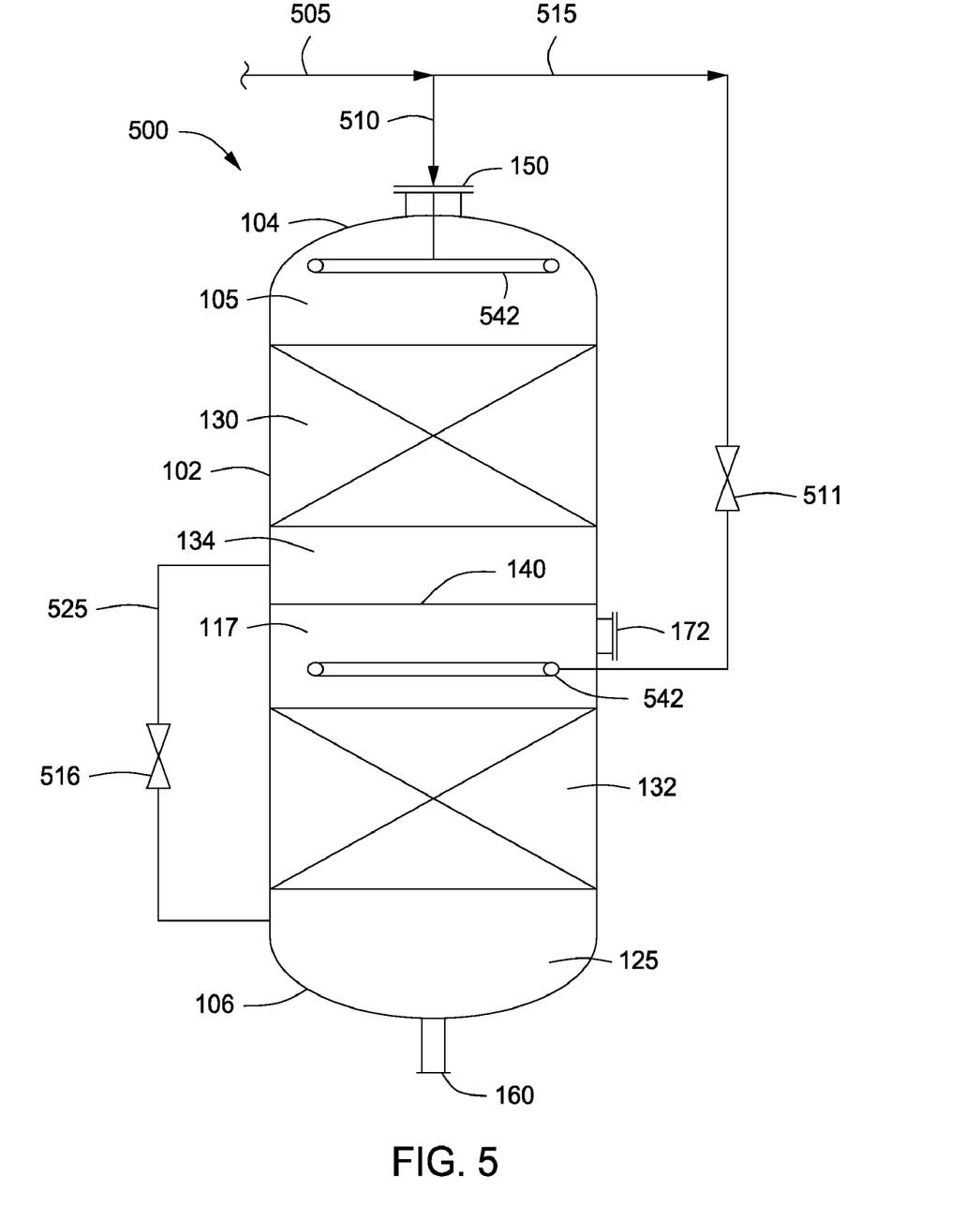
FIG. 5 depicts a partial cross-sectional view of yet another illustrative contactor according to one or more embodiments described.

FIG. 5 depicts a partial cross-sectional view of another illustrative contactor 500 according to one or more embodiments. The contactor 500 can include a body 102, a first end or head 104 defining a volume 105 therein, a second end or head 106 defining a volume 125 therein, a baffle 140, and one or more connections (three are shown 150, 160, and 172). Two or more fixed beds (two are shown 130, 132) can be disposed within and across the inner diameter (i.e. cross-section) of the body 102, forming volumes 117, 134 therebetween. In one or more embodiments, the bypasses (i.e. flow paths) 515, 525 can be external to the beds 130, 132, and disposed about the exterior of the body 102 and/or heads 104, 106. One or more flow control devices 511, 516 including, but not limited to valves, dampers, variable orifice diffusers, or the functional equivalent thereof can be disposed within the one or more flow paths 510, 515, 525 to block or regulate fluid flow therethrough. In one or more embodiments, the pressure control devices 511, 516 can be valves as depicted in FIG. 5.

A second end of the one or more flowpaths 510 can be in fluid communication with the volume 105 defined by the head 104 and the top of the first bed 130. A first end of the flowpath 515 can be in fluid communication with the one or more flowpaths 505, while a second end of the flowpath 515 can be in fluid communication with the volume 117 defined by the baffle 140 and the top of the second bed 132. A first end of the one or more flowpaths 525 can be in fluid communication with the volume 134 defined by the bottom of the first bed 130 and the baffle 140, and a second end of the one or more flowpaths 525 can be in fluid communication with the volume 125 defined by head 106 and the bottom of the second bed 132.

One or more diffusers 542 can be disposed within the first volume 105, about a second end of the one or more flowpaths 510 which can enter the contactor 500 via connection 150. One or more diffusers 542 can be also disposed or located adjacent to the second end of the one or more flowpaths 515 within the volume 117. In one or more embodiments, the one or more diffusers 542 can be the same as the diffuser 142 discussed above, or the one or more diffusers 542 can be a pipe header, as depicted in FIG. 5. The pipe header 542 can be a circular or tree-shaped conduit containing one or more apertures. In one or more embodiments, one or more spray nozzles (not shown) can be disposed within some or all of the apertures of the one or more diffusers 542. In one or more embodiments, each aperture can have the same diameter or the apertures can have varying diameters to balance or otherwise preferentially disperse fluid flow across the beds 130, 132.

In operation, a fluid, i.e. liquid or gas, in line 505 can be apportioned or otherwise split into a first portion via line 510 and a second portion 515. The first portion can be introduced to the body 102 via the first connection ("inlet") 150, and distributed within the first volume 105 using the first diffuser 542. The first portion of the distributed fluid can flow through the first bed ("upper bed") 130 to provide a treated fluid ("first effluent"). A second portion of the fluid in line 505 can bypass the first bed 130 via the one or more flow paths 515 and be distributed within the volume 117 via the diffuser 542. The second portion of the distributed fluid can flow through the second bed ("lower bed") 132 to provide a treated fluid ("second effluent") exiting the second bed 132 within the volume 125. The first portion of the distributed fluid can be at least 10 vol %, 20 vol %, 50 vol %, 60 vol %, 70 vol %, 80 vol %, 90 vol %, 95 vol %, or 99 vol % of the incoming feed in line 505. The balance can be the second portion of the distributed fluid that is introduced to the second bed 132 via flow path 515.

The treated fluid from the first bed 130 can be isolated or collected on the baffle 140 and then bypassed around the second bed 132 via the flow path(s) 525. The first effluent, from the first bed 130, can be distributed at the outlet of the flow path 525 and can be combined or otherwise mixed with the second effluent. The mixed effluents can exit the contactor 500 via the second connection ("outlet") 160. In one or more embodiments, the fluid flow through the contactor 500 can be reversed, i.e. fluid can be introduced to the contactor via connection 160 and exit via connection 150.

Figure 6:
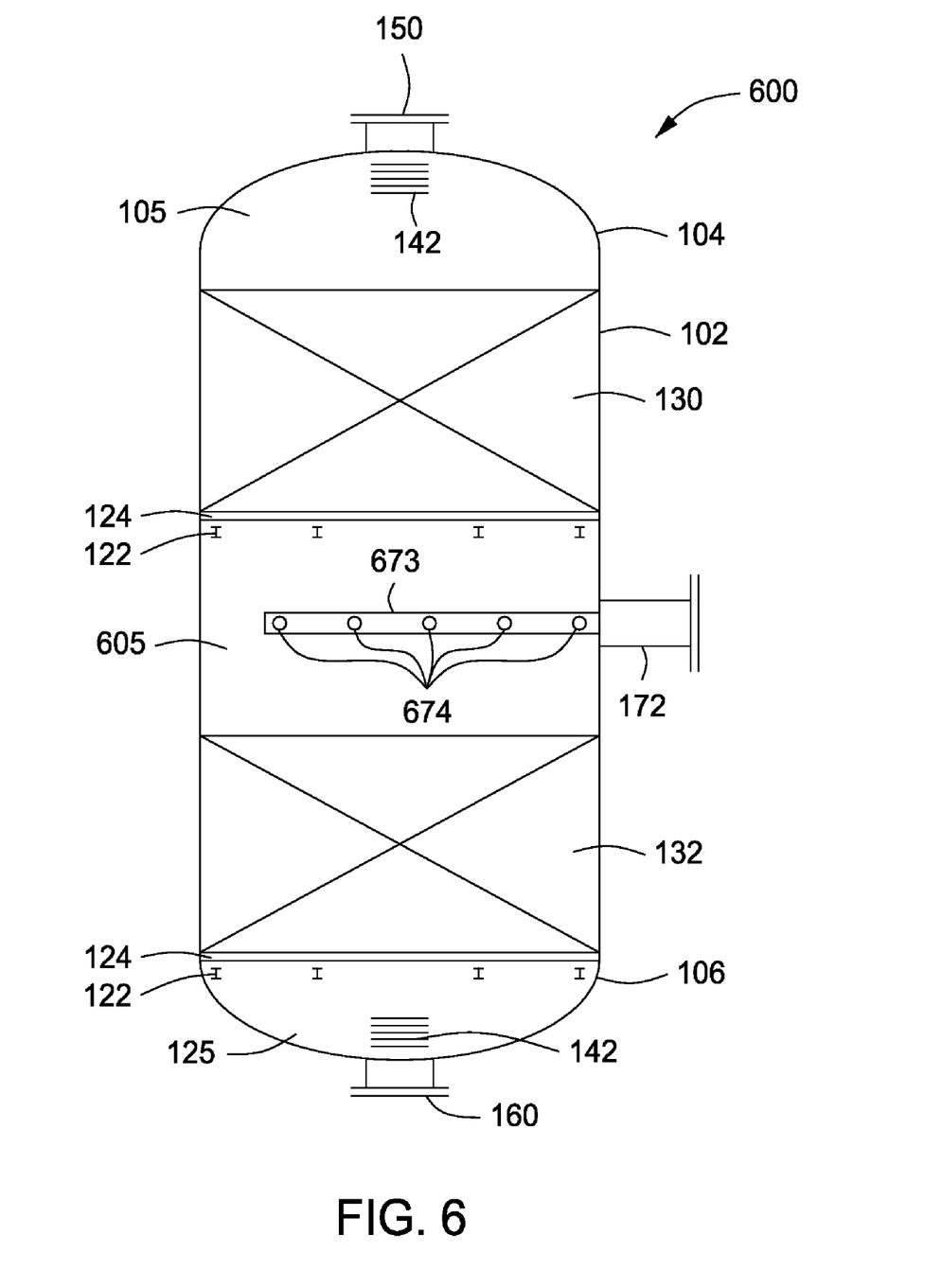
FIG. 6 depicts a partial cross-sectional view of still another illustrative contactor according to one or more embodiments described.

FIG. 6 depicts a partial cross-sectional view of still another illustrative contactor 600 according to one or more embodiments. The contactor 600 can include the body 102, first end or head 104, second end or head 106, one or more connections 150, 160, 172, fixed beds 130, 132, fasteners 122, screens 124, and diffusers 142, as described above. The feed to the contactor 600 can be directed through the side connection 172 into the volume 605. Based on the fluid dynamics and pressure drop within the body 102, the fluid feed can be directed, split, or otherwise apportioned to the beds 130, 132. For example, a first portion of the feed can flow through the first bed 130 in an "upward flow direction" or "first flow direction," forming a first effluent in the volume 105, and a second portion of the feed can flow through the second bed 132 in a "downward flow direction" or "second flow direction," forming a second effluent in the volume 125. The first effluent can be withdrawn from the contactor 600 via the connection 150, while the second effluent can be withdrawn from the contactor 600 via the connection 160.

In one or more embodiments, the fluid feed to the contactor 600 can be divided, split, or apportioned between the connections 150 and 160. In one or more embodiments, a first portion of the feed can enter the contactor 600 via the inlet 150 and a second portion through the inlet 160. The first portion can flow through the first bed 130 in a downward or first direction thereby forming a first effluent which can collect within the volume 605. The second portion can flow through the second bed 132 in an upward or second direction thereby forming a second effluent which can collect within the volume 605. The first and second effluents can contact one another and mix within the volume 605 forming a combined effluent therein. The combined effluent can be withdrawn from the contactor 600 via the side connection 172.

In one or more embodiments, a collector assembly 673 can be disposed within the volume 605. The collector assembly 673 can include a plurality of apertures 674 disposed thereon to allow a plurality of flow paths therethrough. The collector assembly 673 can provide fluid communication between the volume 605 and the connector 172 via the apertures 674.

In one or more embodiments, the collector assembly 673 can include one or more branches or arms (not shown) that extend therefrom. The branches can extend from the body of the collector assembly 673 along a single plane, such as a horizontal plane relative to the center line of the vessel 600. Each branch can also be disposed at an angle relative to the center line of the vessel 600. The angles can deviate from the horizontal by about 1 degree to about 30 degrees in either direction, i.e. up or down. More particularly, the angles can deviate from the horizontal by about −20 degrees to about +20 degrees, or about −10 degrees to about +10 degrees, or about −5 degrees to about +5 degrees.

The apertures 674 can be disposed on the branches or both the branches and the body of the collector assembly 673. The apertures 674 can be sized and shaped according to the desired flow dynamics within the vessel 600. Each aperture 674 can be round, for example. The apertures 674 can be arranged randomly or in an orderly pattern about each branch and/or body of the collector assembly 673. In a particular embodiment, at least one row of apertures 674 is disposed transversely the direction of fluid flow from the bed 130, and at least one row of apertures 674 is disposed transversely the direction of fluid flow from the bed 132.

Figure 7:
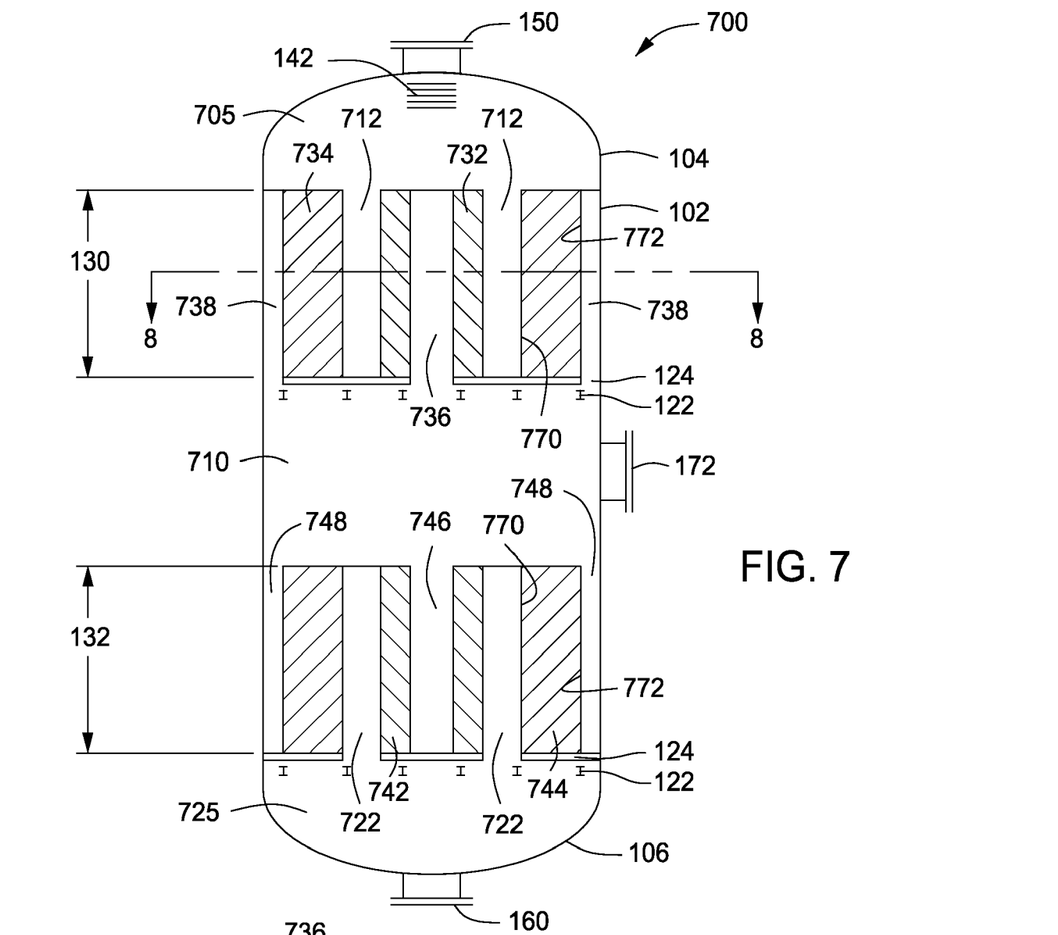
FIG. 7 depicts a partial cross-sectional view of still yet another illustrative contactor according to one or more embodiments described.

FIG. 7 depicts a partial cross-sectional view of still yet another illustrative contactor 700 according to one or more embodiments. The contactor 700 can include the body 102, first end or head 104, second end or head 106, one or more connections 150, 160, 172, fixed beds 130, 132, fasteners 122, screens 124, and diffusers 142, as described above. In one or more embodiments, the first bed 130 can include two or more concentric sub-beds (two are shown) 732, 734. Similarly, the second bed 132 can include two or more concentric sub-beds (two are shown) 742, 744. The first or upper sub-beds 732, 734 can define a plurality of flow channels 712, 736 and 738 therebetween, and the second or lower sub-beds 742, 744 can define a plurality of flow channels 722, 746 and 748 therebetween, as more clearly shown in FIG. 8.

Figure 8:
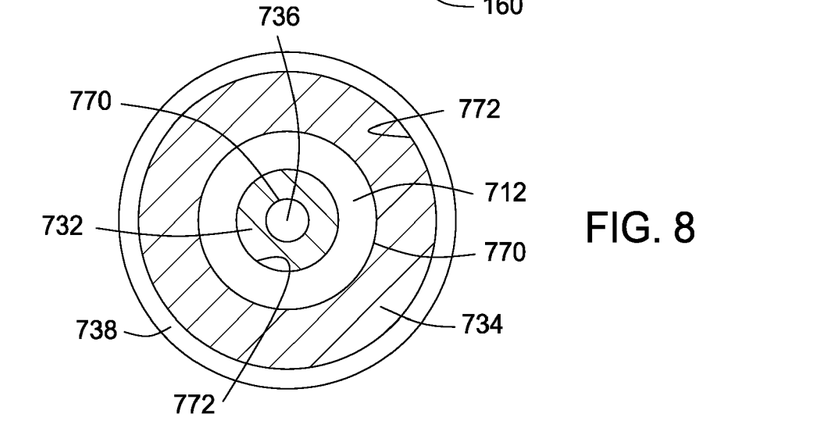
FIG. 8 depicts a cross-sectional view of the first fixed bed and flow paths disposed within the contactor depicted in FIG. 7 along line 8-8.

FIG. 8 depicts a cross-sectional view of the first bed 130 along line 8-8. As shown in FIG. 8, each sub-bed 732, 734 can be annular, i.e. ring-shaped, defined by one or more inner walls 770 and one or more outer walls 772. The one or more inner walls 770 and one or more outer walls 772 can be fabricated using perforated metal or metal screening to permit fluid flow to or from the flow channels 712, 736, 738 and the sub-beds 732, 734. It is to be understood that each sub-bed 742, 744 of the second fixed bed 132 can be arranged in the same way as the sub-beds 732, 734, and as depicted in FIG. 8. Although not shown, the sub-beds 742, 744 of the second fixed bed 132 can be offset, i.e. disposed between different points along the radius of the body 102 than the sub-beds 732, 734 so that a change in flowpath is created.

In operation, the feed can be introduced to the contactor 700 via one or both connections 150, 160. From the connection 150, all or at least a first portion of the feed can enter the body 102, flow through the diffuser 142, though the volume 705, and into the annular, i.e. ring shaped, flow channel 712. The fluid within the flow channel 712 can flow in a first direction, e.g. inward, through the sub-bed 732, emerging as a first effluent in flow channel 736. The fluid within the flow channel 712 can also flow in a second direction, e.g. outward, through sub-bed 734, emerging as a second effluent in the flow channel 738. The first and second effluents can flow into the volume 710 between the beds 130 and 132. From the connection 160, all or at least a second portion of the feed can enter the body 102, flow through a diffuser (not shown), though the volume 725, and into the annular, i.e. ring shaped, flow channel 722. The fluid within the flow channel 722 can flow inward through sub-bed 742, emerging as a third effluent in flow channel 746. The fluid within the flow channel 722 can also flow outward, through sub-bed 744, emerging as a fourth effluent in the flow channel 748. The third and fourth effluents can flow into the volume 710 between beds 130 and 132. The combined effluents (first, second, third and/or fourth) within the volume 710 can be withdrawn from the body 102 via the one or more connections 172.

In one or more embodiments, the feed to the contactor 700 can be directed through the connection 172 on the side wall of the body 102. Within the body 102, a first portion of the feed can enter the flow channels 736, and 738 of the first bed 130. Feed within the flow channel 736 can flow in a second direction, e.g. outwards, through the sub-bed 732, exiting as a first effluent into the flow channel 712. The feed within the flow channel 738 can also flow in a first direction, e.g. inwards, through the sub-bed 734, exiting as a second effluent into the flow channel 712. The combined first and second effluents can flow into the volume 705 within the head 104 and can be withdrawn from the body 102 via the one or more connections 150. A second portion of the feed can enter the flow channels 746, and 748 of the second bed 132. The portion of the feed within the flow channel 746 can flow in a second direction ("outwards") through the sub-bed 742, exiting as a third effluent into the flow channel 722. The portion of the feed within the flow channel 748 can also flow in a first direction ("inwards") through the sub-bed 744, exiting as a fourth effluent into the flow channel 722. The combined third and fourth effluents can flow into the volume 725 within the head 106 and can be withdrawn from the body 102 via the one or more connections 160.

The contactors 100, 200, 500, 600 and 700 can be used with homogeneous gases and/or liquid phase fluids, as well as two-phase (i.e. gas and liquid phase) fluids. Any one or more contactors 100, 200, 500, 600 and 700 can be used, alone or in any combination whether in parallel or series or both. Any one or more contactors 100, 200, 500, 600 and 700 can be used, alone or in any combination whether in parallel or series or both, as a carbon monoxide shift reactor, such as for shifting carbon monoxide in syngas to carbon dioxide.

In one or more embodiments, a vessel can be modified or retrofitted to provide any one of the contactors 100, 200, 500, 600 and 700 described herein. For example, a retrofit could include installing the fasteners 122 and screens 124 based upon the desired number of beds 130 to be used. One or more fluid flow paths 110, 115 can be formed within the appropriate bed 130,132 or disposed on an external surface of the vessel as depicted in FIG. 5. The one or more diffusers 142 can be installed adjacent the end of the flow paths 110, 115, and the baffle(s) 140 can be fitted between adjacent beds 130, 132. Such a retrofit can be advantageous where increasing the flow through the contactor is desired. Increasing flow through a single bed contactor would undesirably increase pressure drop through the contactor. The addition of a second bed 132 within the contactor permits a reduction in the bed depth in the first 130 and second 132 beds while retaining the full volume of activated solids, e.g. catalysts, within the contactor. Since flow through the contactor can be split so as to flow in parallel across the two beds 130, 132, bed depth can be decreased and the flowrate through the contactor can be increased while maintaining a relatively constant pressure drop.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for contacting one or more fluids and one or more solids comprising:
   introducing a feed comprising carbon monoxide to a contactor comprising:
   a body having a first head and a second head disposed thereon;
   first and second fixed beds disposed across a cross-section of the body;
   one or more unobstructed flow paths adapted to bypass each fixed bed; and
   one or more baffles disposed between the fixed beds, wherein the one or more baffles prevent fluid flow between the fixed beds;
   flowing a first portion of the feed through the first fixed bed to provide a first effluent comprising carbon dioxide;

flowing a second portion of the feed comprising carbon monoxide through the one or more flow paths bypassing the first fixed bed;

flowing the second portion of the feed through the second fixed bed to provide a second effluent comprising carbon dioxide;

flowing the first effluent through the one or more flow paths bypassing the second fixed bed; and combining the first effluent and second effluent.

2. The method of claim 1, further comprising one or more diffusers disposed adjacent a discharge end of the one or more flow paths.

3. The method of claim 1, wherein the feed further comprises hydrogen.

4. The method of claim 1, further comprising one or more pressure control devices disposed within the one or more flow paths.

5. The method of claim 4, wherein the one or more pressure control devices comprise valves, dampers, variable orifice diffusers, or any combination thereof.

6. The method of claim 1, wherein each fixed bed comprises a first inert layer, a catalyst layer and a second inert layer.

7. The method of claim 6, wherein the first inert layer comprises tabular alumina, mullite, ceramic, mixtures thereof or combinations thereof, and the second inert layer comprises tabular alumina, mullite, ceramic, mixtures thereof or combinations thereof.

8. The method of claim 1, wherein each fixed bed comprises one or more catalysts for converting at least a portion of the carbon monoxide in the feed to carbon dioxide.

9. The method of claim 6, wherein the catalyst layer comprises iron, chromium, copper, zinc, aluminum, iron oxides, chromium oxides, cupric oxides, zinc oxides, aluminum oxides, iron alloys, chromium alloys, copper alloys, zinc alloys, aluminum alloys, mixtures thereof and combinations thereof.

10. The method of claim 1, wherein all of the second portion of the feed comprising carbon monoxide bypasses the first fixed bed, and wherein all of the first effluent comprising carbon monoxide bypasses the second fixed bed.

11. A split-flow contactor comprising:

a body having a first head and a second head disposed thereon;

two or more discrete contact zones disposed across a cross-section of the body, wherein each contact zone comprises one or more catalysts, one or more ion exchange resins, one or more absorbents, one or more adsorbents, or any combination thereof, and wherein each contact zone comprises a first bed disposed within a second bed such that an annulus is formed between the first bed and the second bed, the annulus providing an annular flow path therethrough; and a mixing volume disposed between the beds wherein an effluent from the first bed can contact and mix with an effluent from the second bed therein, and wherein a feed can enter the contactor through any two of the first head, the second head, and the body.

12. The contactor of claim 11, further comprising one or more flow paths disposed through the first bed so that at least a portion of the feed can bypass the contact zone of the first bed.

13. A method for contacting one or more fluids and one or more solids comprising:

introducing a feed comprising carbon monoxide to a contactor, the contactor comprising:

a body having a first end and a second end;

at least one first catalyst bed and at least one second catalyst bed disposed across a cross-section of the body;

one or more unobstructed flow paths that bypass each of the first and second catalyst beds; and one or more baffles disposed between the first catalyst bed and the second catalyst bed, wherein the one or more baffles prevent fluid flow between the first and second catalyst beds;

directing a first portion of the feed through the first catalyst bed to provide a first effluent comprising carbon dioxide;

directing a second portion of the feed through the one or more unobstructed flow paths that bypass the first catalyst bed and through the second catalyst bed to provide a second effluent comprising carbon dioxide;

directing the first effluent through the one or more unobstructed flow paths that bypass the second catalyst bed; and combining the first and second effluents to provide a mixed effluent.

14. The method of claim 13, wherein a pressure differential between the first portion of the feed and the first effluent is equal to a pressure differential between the second portion of the feed and the second effluent.

15. The method of claim 13, wherein at least one of the first catalyst bed and the second catalyst beds further comprises one or more first inert layers and one or more second inert layers, and wherein the at least one of the first catalyst bed and the second catalyst bed is disposed between the first inert layer and the second inert layer.

16. The method of claim 13, wherein the one or more flow paths are disposed external to the body and comprise one or more pressure control devices disposed therein.

17. The method of claim 13, further comprising recovering the mixed effluent from the contactor.

18. The method of claim 13, wherein the one or more flow paths are disposed through the first and second catalyst beds.

19. The method of claim 13, wherein the feed is split unequally between the first portion of the feed and the second portion of the feed.

20. The method of claim 13, wherein an amount of the first portion of the feed is equal to at least 60 vol % of the feed.

* * * * *